Jan. 24, 1967   R. DUNN   3,300,755

AUTOMATIC LIGHTING AND WARNING SYSTEM

Filed June 1, 1964   2 Sheets-Sheet 1

INVENTOR.
Ralph Dunn
BY
*Manfred M. Warren*
His, Attorney

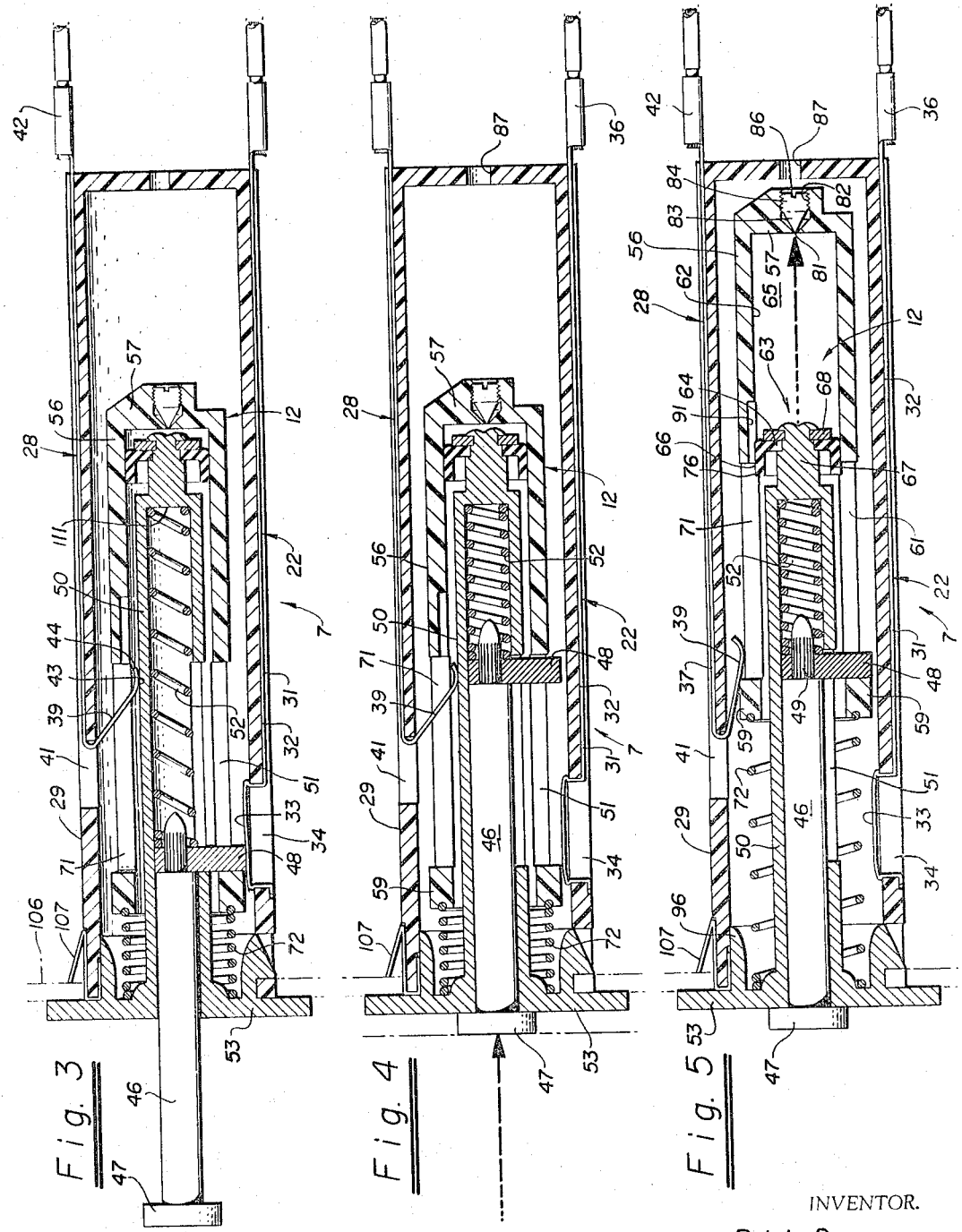

United States Patent Office 3,300,755
Patented Jan. 24, 1967

3,300,755
AUTOMATIC LIGHTING AND WARNING SYSTEM
Ralph Dunn, 3839 Stevely, Apt. 19,
Los Angeles, Calif. 90008
Filed June 1, 1964, Ser. No. 371,570
7 Claims. (Cl. 340—52)

This invention relates to automatic lighting and warning systems for vehicles and more particularly to a system for illuminating the interior of that vehicle and warning a passenger in that vehicle to fasten his safety belt.

An object of the present invention is to combine in the same system an automatic interior illuminating system and an automatic seat belt warning system in a vehicle.

Another object of the present invention is to provide an automatic seat belt warning system for a vehicle which is actuated by the opening and closing of a door of that vehicle and is independent of the operation of the vehicle motor.

A further object of the present invention is to provide an automatic device composed of a minimum number of parts which will give accurate and reliable service over a wide temperature range as well as other adverse conditions that a device connected to an automobile is subject to, such as vibration, shock, dust and the like.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings (two sheets):

FIGURE 3 is a side elevation view, shown partly in cross section, of the switch taken generally along the lines 3—3 in FIGURE 2 on a slightly enlarged scale showing the parts in one position.

FIGURE 4 is a side elevational view of the switch similar to FIGURE 3 showing the parts in another position.

FIGURE 5 is a side elevation view of the switch similar to the view in FIGURE 4 illustrating the parts in still another position.

Figure 1:
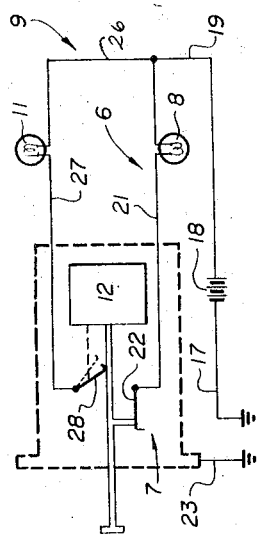
FIGURE 1 is a schematic diagram of an embodiment of an automatic lighting and warning system constructed in accordance with the invention.
Figure 2:
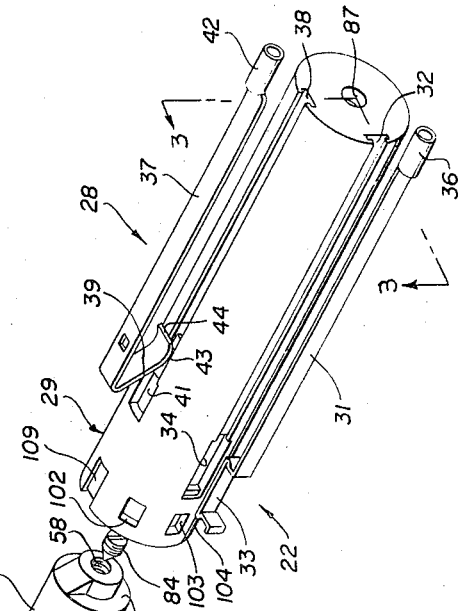
FIGURE 2 is an exploded perspective view illustrating the assembly of the switch schematically shown in FIGURE 1.
Figure 2:
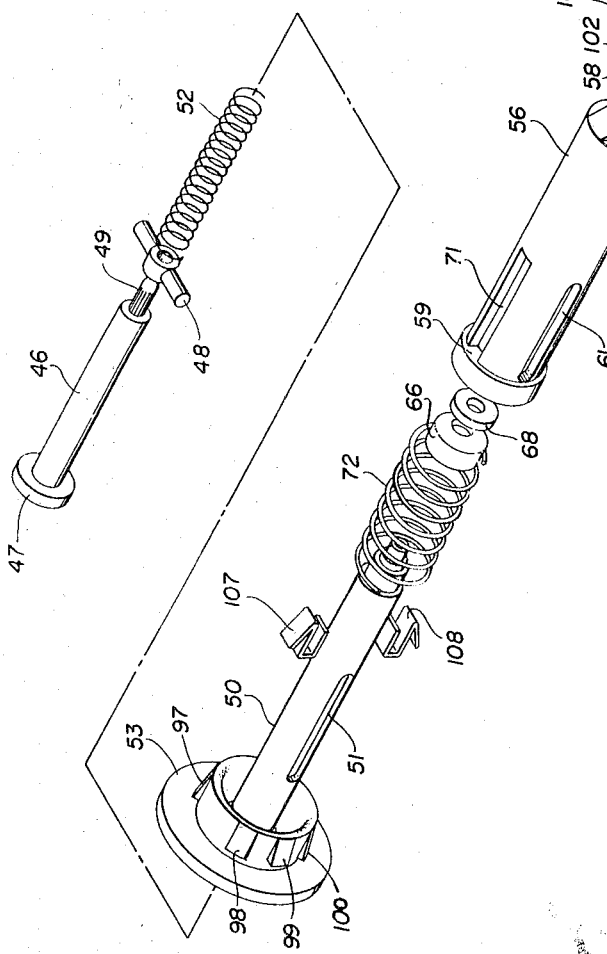

The automatic electrical switch system of the present invention consists briefly of a vehicle interior lighting circuit 6 and eletcric lamp 8 therein, a warning circuit 9 and electrically actuated warning device 11 therein, switch means 7 adapted for engagement with the actuation by the door upon opening and closing thereof and being formed and connected for energizing and de-enerizing the illuminating circuit 6 upon opening and closing the door respectively and being formed and connected to energize the warning circuit at the time the door is opened, and time delay means 12 connected to the switch means 7 for holding the warning circuit 9 energized for a predetermined time period after closing the door.

An advantage of the present system where it is used for warning vehicle passeangers to fasten their safety belts is the fact that it is combined with the existing circuit used to automatically operate the lamps for illuminating the interior of most vehicles. The warning system is independent of the operation of the motor or ignition and is operated by the opening and closing of the vehicle door. Thus if the automobile stops to pick up a passenger and the motor remains at idle, the passenger will be warned to fasten his safety belt when he enters the door.

The interior lighting circuit 6 here consists briefly of a lead 17 connected to ground, a battery 18, lead 19 connecting the interior lights 8, lead 21 connected to contact 22 of switch means 7 and lead 23 connected to ground.

The seat belt warning circuit is connected in parallel to the lighting circuit and consists briefly of lead line 26 connected to lead 19; signal indicating light 11 connected to lead line 27; contact 28, connected to switch means 7, which in turn is connected to ground lead 23.

The seat belt signal indicator 11 is here shown as a lamp which may be positioned behind and for lighting a sign which carries the warning "Fasten Seat Belt" or other appropriate wording. The signal indicator may also be an electrical bell, buzzer or other audible warning signal.

Another advantage of combining the seat belt warning circuit with the automatic interior illuminating circuit is the fact that the switch normally located in the door jamb of the automobiles may be used to energize both circuits. The switch here used is contained within a compact housing 29 which may be made of plastic or other dielectric material. The housing is here formed as a hollow cylinder so that it may be easily inserted through a circular opening in the door jamb.

Switch contact 22 previously mentioned and here described in greater detail, consists of a thin elongated strip conductor 31 dimensioned for insertion into an elongated recess 32 formed in the periphery of housing 29 and formed with an offset portion 33 which protrudes through an opening 34 formed in housing 29, and a suitable lead connector 36 formed at the end distant from the offset portion 33.

Second contact 28 previously mentioned and here described more fully, consists briefly of an elongated conductor strip 37 dimensioned for receipt in a recess 38 formed in housing 29, an offset portion 39 positioned for projection through an opening 41 formed in housing 29 and a lead connector 42 formed in the end opposite the offset portion 39. Offset portion 39 is formed with a curved portion 43 adjacent the end 44 to provide contact with elongated sleeve 50.

Switch means 7 here consists of an elongated member 46 carrying a head 47 which is positioned for engagement with the opening and closing of the vehicle door for driving the elongated member between a first fully extended position and a second position when the door is closed and a conducting metal arm 48 connected at the other end 49 thereof, an elongated sleeve 50 made from a conducting material such as zinc formed for slidably receiving elongated member 46 and formed with a pair of elongated slots 51 for receiving arm 48 and a spring 52 for bearing against arm 48 for biasing member 46 to a first terminal position so that arm 48 is in electrical contact with contact 22. Sleeve 50 is here constructed integral with a flange 53 which is connected to and in electrical contact with the metal side wall of the automobile.

A still further advantage of the present electrical system is the fact that the use of one compact switch to operate two circuits eliminates two installations of two independent switches. The delayed switch means utilizes a floating cylinder and a fixed piston to obtain timed delayed deactuation of the seat belt alarm. The seat belt warning light goes on immediately after the vehicle door is opened and the timed interval does not begin until the door is closed. The time delayed switch means here consists of a dielectric member 56 mounted in housing 29 for selectively moving movable contact 37 in and out of electrical connection with sleeve 50. Member 56 is generally cylindrical and is formed with an end wall 57 formed with a small air opening 58 and an annular flange 59 at the opposite end. A pair of elongated slots 61 are formed in the cylinder wall adjacent flange 59 for slidably receiving arm 48 therein. Member 56 is formed with a smooth cylindrical interior wall 62 forming a chamber for receiving stationary piston 63. Piston 63 here consists briefly of a rubber or flexible member 64 formed with an annular flange 66 for sliding engagement with the wall 62 of the chamber 65. Flexible member 64 is affixed to an extension 67 of sleeve 50 by washer 68. Member 56 is formed with an elongated slot 71 adjacent flange 59 for receiving contact 28 therethrough. Spring 72 bears against flange 59 and flange 53 for biasing member 56 to a second terminal position.

One of the problems in providing a time delayed switch in automobile has been the difficulty in obtaining one that gives approximately the same time delay under all temperature conditions. Automobiles are subject to temperatures below zero and about 100° F. and the standard suction cup time delay switches are adversely affected by these extremes in temperature and do not give constant delayed time interval action. Applicant has provided a stationary piston and a floating cylinder which gives sufficiently accurate intervaled time under the adverse conditions set forth. The flange 66 on piston 63 is arranged so that when member 56 is carried by arm 48 on rod 46 rapidly to its first terminal position, flange 66 which is arranged with its free end 76 toward the open end of the chamber will be moved radially inwardly by the pressure built up in chamber 65. Conversely, when member 56 is moved slowly to its second terminal position by the biasing force of spring 72, flange 66 on stationary piston 63 will grip the side wall 62 of member 56 due to the vacuum in chamber 65. It can be seen, therefore, that the action of the elastic piston member 64 thus serves to coact with floating cylinder 56 to give time delayed relative movement therebetween in one direction of the floating cylinder.

Adjustment of the time interval of the delay switch is accomplished by providing an orifice opening 81 in end wall 57 with an enlarged internally threaded portion 82 for receiving needle valve 83 connected to threaded portion 84 formed with slot 86 for adjustment by a screw driver. Housing 29 is provided with an opening 87 for receiving a screw driver therethrough so that adjustment can be made on needle valve 83.

The switch of the present invention is designed to provide fast making and breaking of the contacts. Rapid contact is made between first contact 22 and arm 48 when spring 52 moves arm 48 and rod 46 rapidly to its first terminal position. Rapid breaking of first contact 22 and arm 48 is effected when the vehicle door is slammed against rod 46 moving arm 48 rapidly out of electrical contact with the first contact 22. Rapid making of the second electrical circuit 9 is effected by the rapid movement of member 56 which is carried by rod 46 and arm 48 under the biasing force of spring 52 upon opening of the vehicle door. Rapid breaking of the second circuit is accomplished by enlarging the inside diameter of a portion 91 of wall 62 of member 56 adjacent slot opening 71 providing a channel from chamber 65 past flange 66 of stationary piston 63. In operation, as the enlarged portion 91, of floating cylinder 56 reaches flange 66 in its movement toward the second terminal position, the vacuum in chamber 65 will be released as air is permitted to rush past flange 66 into chamber 65, thus permitting floating cylinder 56 to move rapidly during the last portion of its delayed timed movement. Flange 59 and enlarged portion 91 are so arranged that flange 59 will bear against portion 39 of contact 28 when the floating piston is moving rapidly to its second terminal position.

The delayed switch of the present invention is especially constructed for rapid installation on mass production lines. Housing 29 is constructed in two easily assembled parts. As stated above, sleeve 50 and flange 53 are integrally connected. Flange 53 is provided with an annular flange 96 having a plurality of wedge shaped protrusions 97, 98, 99 and 100 for interlocking with matching opening in housing 29 here illustrated by openings 102, 103 and 104. Flange 53 is prevented from moving away from auto wall 106 by spring clips 107 and 108 seated in slots such as slot 109 in housing 29. To install in a car, the connecting leads are brought out through a ¾ inch diameter (to fit the switch) round hole in the wall 106, and connected to lead connectors 36 and 42. The switch is then pushed through the hole, lead connectors first, until spring clips 107 and 108 snap through and flange 53 rests against the wall.

The operation of the system is as follows:

As seen in FIGURE 5, the switch is in position for opening both circuits. The automobile door in its closed position holds rod 46 in its second terminal position and spring 52 is compressed against closed end wall 111 of sleeve 50 by arm 48. Floating member 56 is in its second terminal position under the biasing force of spring 72. Flange 59 is in contact with arm 39 of contact 28, breaking electrical contact.

When the vehicle door is open, the switch will rapidly assume the position shown in FIGURE 3. Spring 52, which is sufficiently strong to overcome the force of spring 72 which is biased in the opposite direction, biases elongated member 46 to its first terminal position along with floating member 56 which is connected to rod 46 at flange 59 by arm 48. With rod 46 and member 56 in their first terminal positions, arm 48 is in physical contact with electrical contact 22 at offset portion 33 and interior illuminating light 8 is energized. At the same time, the seat belt warning signal 11 is energized by the physical contact of curved portion 43 of second electrical contact 28 being in physical contact with conducting sleeve 50.

In order to turn off the interior illuminating lights and to start the delayed time interval of the warning light 11, rod 46 is moved to its second terminal position by the closing of the vehicle door. The position of the elements of the switch at the instant after the closing of the door is shown in FIGURE 4. During the movement of rod 46 from a first to a second terminal position, arm 48 moves away from physical contact with offset portion 33 of the first electrical contact 22 and thus breaks connection turning off the interior illuminating light 8. Arm 48 moves without restriction in slot 61 of member 56 and compresses spring 52. Movement of arm 48 out of contact with flange 59 permits spring 72 to move floating cylinder 56 towards its second terminal position. Second electrical contact 28 remains in electrical connection with sleeve 50 until flange 59 reaches portion 39. The seat belt indicating signal 11 remains energized for a period of time depending upon the energy of spring 72 and the rate of admission of fluid air to chamber 65. When floating cylinder 56 reaches the second terminal position, as shown in FIGURE 5, electrical contact is broken by flange 59 moving curved portion 43 of contact 28 out of physical contact with sleeve 50.

Molded in ribs provided for centering and aligning the various parts are not shown.

I claim:

1. An electric switch for operation by a vehicle door and having electric contacts adapted for connection to an illuminating circuit and warning device circuit, an elongated member mounted for engagement with one of said contacts and adapted for engagement with and displacement by a vehicle door and mounted for reciprocating between first and second positions for respectively energizing and de-energizing said illuminating circuit, a cylindrical member mounted for engagement with another of said contacts and for reciprocation between first and second positions respectively energizing and de-energizing said warning circuit, said cylindrical member being connected to said elongated member for movement in concert to their respective first positions and for independent movement to their second positions, first resilient means connected to and biasing said cylindrical member to its second position, second resilient means biasing said elongated member to its first position, and retarding means connected to said cylindrical member resisting the force of said first spring for timed movement of said cylindrical member to its second position.

2. An electric switch for use in an illuminating and warning light circuit comprising, a housing adapted for mounting on an automobile wall, a cylindrical member having an internal cylindrical wall and an end wall forming an open ended chamber and mounted within said housing for axial reciprocation between first and second positions and formed with longitudinally extending slot openings therethrough, a cup piston formed and dimensioned for sliding fit on said cylinder wall and coacting therewith to provide slow timed relative movement between said piston and cylinder, an electrically conducting sleeve mounted within said housing and supporting said piston at one end and having a longitudinally extending slot opening therethrough, an elongated member formed and dimensioned for sliding receipt within said sleeve and for coaxial reciprocating movement therewith between a first and second position and having an arm connected at one end protruding radially therefrom and extending through said sleeve and cylinder wall slots, a first electric contact mounted on said housing and positioned for electrical contact with said arm when said elongated member is at said first position and adapted for connection to said illuminating light circuit, said elongated member being out of electrical contact with said first contact when said elongated member is at said second position, a second electrical contact mounted on said housing and positioned for electrical contact with said sleeve when said cylindrical member is in said first position and between said first and second positions and adapted for connection to said warning light circuit, said cylindrical member in second position engaging and displacing said second contact out of engagement with said sleeve, a first spring biasing said cylindrical member to said second position for breaking electrical contact between said sleeve and said second contact, and a second spring biasing said elongated member and said cylindrical member to their first positions against the resistance of said first spring for making electrical contact between said sleeve and first contact.

3. The switch of claim 2 in which an adjustable bleed valve is mounted on said end wall of said chamber for varying the rate of fluid flow to said chamber for varying the relative rate of movement between said member and said sleeve.

4. The switch of claim 2 in which a portion of said cylindrical wall is formed with a channel connecting said chamber and the atmosphere for rapid movement of said first-named member to its second terminal position as it nears said terminal position for effecting a rapid breaking of said warning circuit.

5. An automatic lighting and warning system comprising, a vehicle having a door frame and door hinged therein for opening and closing for passenger ingress and egress, a vehicle interior lighting circuit and an electric lamp therein, a warning circuit and electrically actuated warning device therein, switch means having a housing mounted in said frame and a spring biased reciprocating part carried by said housing for engagement with and reciprocation by said door upon opening and closing, first contact means mounted for opening and closing by said part upon reciprocation thereof and being connected in said interior lighting circuit for energizing and de-energizing said lighting circuit upon opening and closing of said door respectively, second contact means having an operative connection with said part for opening and closing thereby upon reciprocation of said part and being connected in said warning circuit to effect energization and de-energization thereof, and time delay means provided in said operating connection and formed for holding said second contact means closed and said warning circuit energized for a predetermined interval after the closing of said door.

6. An automatic lighting and warning system as defined in claim 5, wherein time delay means includes an actuating member for said second contact means mounted for reciprocation between first and second positions energizing and de-energizing said warning circuit respectively, a spring biasing said member from first position to second position, said part having first and second positions energizing and de-energizing said lighting circuit respectively, and said member being connected to said part for movement in concern to their respective first positions and for independent movement to their respective second positions, and means retarding the displacement of said member to its second position.

7. The automatic lighting and warning system of claim 6 in which said member comprises a cylindrical wall and an end wall forming an open ended chamber mounted for axial reciprocation between its said first and second positions and said last-named means includes a cup shaped member mounted for sliding engagement with said wall and positioned for respectively permitting and preventing passage of air therebetween upon movement of said member to first and second positions, said wall being formed with a passage therethrough to regulate passage of air to said chamber.

References Cited by the Examiner
UNITED STATES PATENTS

| | | | |
|---|---|---|---|
| 2,442,971 | 6/1948 | Chessrown | 200—34 |
| 2,802,142 | 8/1957 | Johnson | 315—84 X |
| 3,225,150 | 12/1965 | Hershberger | 200—33 |

NEIL C. READ, *Primary Examiner.*

I. J. LEVIN, *Assistant Examiner.*